US010264269B2

(12) United States Patent
Tourapis et al.

(10) Patent No.: US 10,264,269 B2
(45) Date of Patent: Apr. 16, 2019

(54) METADATA HINTS TO SUPPORT BEST EFFORT DECODING FOR GREEN MPEG APPLICATIONS

(71) Applicant: Apple Inc., Cupertino, CA (US)

(72) Inventors: Alexandros Tourapis, Milpitas, CA (US); David W. Singer, San Francisco, CA (US); Krasimir D. Kolarov, Menlo Park, CA (US); Steven E. Saunders, Cupertino, CA (US); Guy Cote, San Jose, CA (US); Sorin Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 14/687,316

(22) Filed: Apr. 15, 2015

(65) Prior Publication Data

US 2016/0105675 A1  Apr. 14, 2016

Related U.S. Application Data

(60) Provisional application No. 62/063,003, filed on Oct. 13, 2014.

(51) Int. Cl.
*H04N 19/12* (2014.01)
*H04N 19/44* (2014.01)
(Continued)

(52) U.S. Cl.
CPC ......... *H04N 19/156* (2014.11); *H04N 19/105* (2014.11); *H04N 19/12* (2014.11);
(Continued)

(58) Field of Classification Search
None
See application file for complete search history.

(56) References Cited

U.S. PATENT DOCUMENTS 8,594,178 B2  11/2013 Li et al.
2006/0188025 A1*  8/2006 Hannuksela ......... H04N 19/105
375/240.27
(Continued)

FOREIGN PATENT DOCUMENTS

EP    0912063 A2    4/1999
WO    2014090950 A1    6/2014
WO    2014138331 A2    9/2014

OTHER PUBLICATIONS

Tourapis et al., "Best Effort Decoding for Green MPEG applications", ISO/IEC JTC1/SC29/WG11 MPEG2014/m34180, Sapporo, Japan, Jul. 2014.
(Continued)

*Primary Examiner* — Dakshesh D Parikh
(74) *Attorney, Agent, or Firm* — BakerHostetler

(57) ABSTRACT

In a coding system, an encoder codes video data according to a predetermined protocol, which, when decoded causes an associated decoder to perform a predetermined sequence of decoding operations. The encoder may perform local decodes of the coded video data, both in the manner dictated by the coding protocol that is at work and also by one or more alternative decoding operations. The encoder may estimate relative performance of the alternative decoding operations as compared to a decoding operation that is mandated by the coding protocol. The encoder may provide identifiers in metadata that is associated with the coded video data to identify such levels of distortion and/or levels of resources conserved. A decoder may refer to such identifiers when determining when to engage alternative decoding operations as may be warranted under resource conservation policies.

17 Claims, 7 Drawing Sheets

(51) Int. Cl.
    *H04N 19/46* (2014.01)
    *H04N 19/105* (2014.01)
    *H04N 19/147* (2014.01)
    *H04N 19/154* (2014.01)
    *H04N 19/156* (2014.01)
    *H04N 19/172* (2014.01)
    *H04N 19/196* (2014.01)

(52) U.S. Cl.
    CPC ......... *H04N 19/147* (2014.11); *H04N 19/154* (2014.11); *H04N 19/172* (2014.11); *H04N 19/196* (2014.11); *H04N 19/46* (2014.11); *H04N 19/44* (2014.11)

(56) References Cited

U.S. PATENT DOCUMENTS

| | | | |
|---|---|---|---|
| 2008/0062018 | A1 | 3/2008 | Normile et al. |
| 2008/0063085 | A1* | 3/2008 | Wu .................... H04N 7/26946 375/240.25 |
| 2010/0020886 | A1 | 1/2010 | Raveendran et al. |
| 2011/0299604 | A1* | 12/2011 | Price ...................... H04N 19/46 375/240.26 |
| 2014/0010282 | A1 | 1/2014 | He et al. |
| 2014/0286407 | A1* | 9/2014 | Montminy ............ H04N 19/164 375/240.07 |

OTHER PUBLICATIONS

Tourapis et al., "Best Effort Decoding for Green MPEG—An example application", ISO/IEC JTC1/SC29/WG11 MPEG2014/M35148, Strasbourg, France, Oct. 2014.

Nogues et al., "HEVC Decoding with Tunable Image Quality for Green Metadata applications", ISO/IEC JTC1/SC29/WG11 MPEG2014/m35009, Strasbourg, France, Oct. 2014.

Invitation to Pay Additional Fees, dated Dec. 18, 2015, from corresponding International Application No. PCT/US2015/052315, filed Sep. 25, 2015.

Flynn et al., "Best-effort decoding of 10-bit sequences: use-cases, requirements and specification methods", Joint Collaborative Team on Video Coding (JCT-VC) of ITU-T SG16 WP3 and ISO/IEC JTC1/SC29/WG11, 15th Meeting: Geneva, CH, Oct. 23-Nov. 1, 2013 (document: JCTVC-O0043).

Flynn et al., "Best-effort decoding of 10-bit sequences: use-cases, requirements and specification methods", Joint Collaborative Team on Video Coding (JCT-VC) of ITU-T SG16 WP3 and ISO/IEC JTC1/SC29/WG11, 14th Meeting: Vienna, AT, Jul. 25-Aug. 2, 2013 (document: JCTVC-N0291).

Flynn et al., "Decoding a 10-bit sequence using an 8-bit decoder", Joint Collaborative Team on Video Coding (JCT-VC) of ITU-T SG16 WP3 and ISO/IEC JTC1/SC29/WG11, 13th Meeting: Incheon, KR, Apr. 18-26, 2013 (document: JCTVC-M0255).

"Information Technology—Green Video", ISO/IEC JTC 1/SC29, ISO/IEC DIS 23008-1, Apr. 26, 2013.

Flynn et al., "High Efficiency Video Coding (HEVC) Range Extensions text specification: Draft 7", Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014 (document: JCTVC-Q1005_v9).

International Patent Application No. PCT/US2015/052315; Int'l Preliminary Report on Patentability; dated Apr. 27, 2017; 14 pages.

* cited by examiner

100

200

400

600

700

800

METADATA HINTS TO SUPPORT BEST EFFORT DECODING FOR GREEN MPEG APPLICATIONS

PRIORITY

The present application claims priority to U.S. application Ser. No. 62/063,003, filed Oct. 13, 2014, the disclosure of which is incorporated herein by reference.

BACKGROUND

The present disclosure relates to video coding systems involving encoding terminals and decoding terminals, and coding protocols therefor.

There has been considerable interest, especially during the last decade, in achieving power reduction and improving energy efficiency on a variety of applications, such as lighting, car fuel efficiency, as well as the various home or office electrical and electronic devices. This is driven by the desire to save on fuel resources, reduce costs, as well as, in the case of mobile devices, prolong battery and usage time. Most of these savings are achieved through the use of new material, improved fabrication and design processes and hardware, as well as more efficient algorithms and software that may run on such systems. Mobile phones, for example, now use improved semiconductor device fabrication processes as well as more efficient displays to save on power.

At the same time, however, new usage models and applications such as enhanced video delivery and streaming may themselves demand more power from such devices, potentially reducing the benefits achieved through manufacturing. As an example, it is suggested that decoding complexity of the HEVC/H.265 standard may be as close to 2× higher than that of AVC/H.264. In the USA, some estimates state that Internet video currently takes up ~78% of the total Internet traffic, with a significant percentage being consumed on mobile devices. By 2016, it is expected that Internet consumption on mobile devices, including video, would far exceed that consumption on wired devices.

The inventors perceive a need for a coder/decoder system that permits a decoder to dynamically switch among a variety of decoding protocols when local processing environments favor resource conservation. Moreover, the inventors perceive a need for such a system that permits a decoder to estimate when circumstances are favorable for a switch to a resource conservation decoding mode, for example, when loss of resultant image quality would be minimized.

DETAILED DESCRIPTION

Embodiments of the present disclosure provide a coding system in which an encoder codes video data according to a predetermined protocol, which, when decoded causes an associated decoder to perform a predetermined sequence of decoding operations. The encoder may perform local decodes of the coded video data, both in the manner dictated by the coding protocol that is at work and also by one or more alternative decoding operations. The encoder may estimate relative performance of the alternative decoding operations as compared to a decoding operation that is mandated by the coding protocol. The encoder may provide identifiers in metadata that is associated with the coded video data to identify such levels of distortion and/or levels of resources conserved.

A decoder may refer to such identifiers when determining when to engage alternative decoding operations as may be warranted under resource conservation policies. By referring to such identifiers, the decoder may engage the alternative decoding operations when operating circumstances indicate it would be advantageous to do so (e.g., the distortion induced would be relatively low and/or the resource savings would be relatively high). In other embodiments, the decoder may provide messages back to an encoder to identify when alternative decoding operations were engaged and which type of operations were performed. An encoder may update its local image of the state of the decoder in response to such messages.

Figure 1:
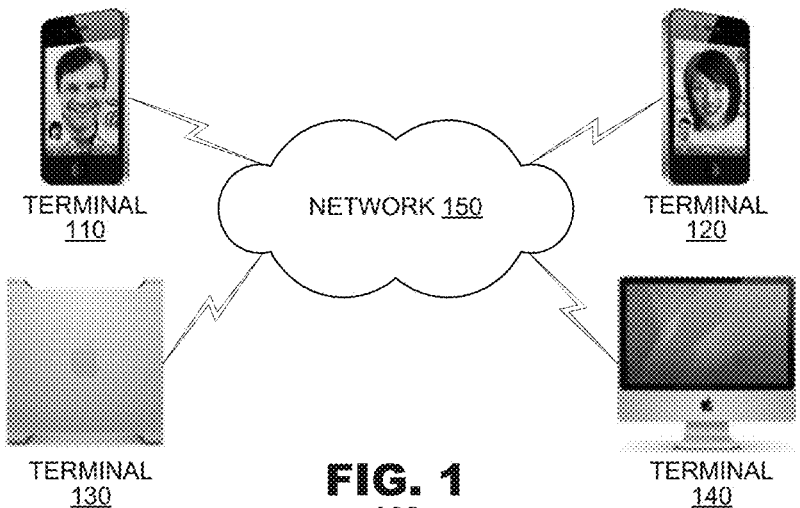
FIG. 1 illustrates a simplified block diagram of a video coding system according to an embodiment of the present disclosure.

FIG. 1 illustrates a simplified block diagram of a video coding system 100 according to an embodiment of the present disclosure. The system 100 may include a plurality of terminals 110-140 interconnected via a network 150. Certain terminals may code video data for transmission to another terminal via the network 150. Other terminals may receive the coded video data of the other terminal from the network 150, decode the coded data and consume video data recovered therefrom, typically by displaying the decoded video.

A video coding system 100 may be used in a variety of applications. In a first application, a pair of terminals 110, 120 may support real time bidirectional exchange of coded video to establish a video conferencing session between them. In another application, a terminal 130 may code pre-produced video (for example, television or movie programming) and store the coded video for delivery to one or, often, many downloading client(s) 140. Thus, the video being coded may be live or pre-produced and it may be distributed in a one-to-one or one-to-many distribution model. For the purposes of the present discussion, the type of video and the video distribution schemes are immaterial unless otherwise noted.

In FIG. 1, the terminals 110-140 are illustrated as smart phones, servers and personal computers respectively but the principles of the present disclosure are not so limited. Embodiments of the present disclosure find application, among others, with set-top boxes, TVs, computers (both desktop and laptop computers), tablet computers, computer servers, media players and/or dedicated video conferencing and entertainment equipment, among others.

The network 150 represents any number of networks that convey coded video data between the terminals 110-140, including, for example, wireline and/or wireless communication networks. The communication network 150 may exchange data in circuit-switched or packet-switched channels. Representative networks include telecommunications networks, local area networks, wide area networks and/or the Internet. For the purposes of the present discussion, the architecture and topology of the network 150 are immaterial to the operation of the present disclosure unless otherwise noted.

Figure 2:
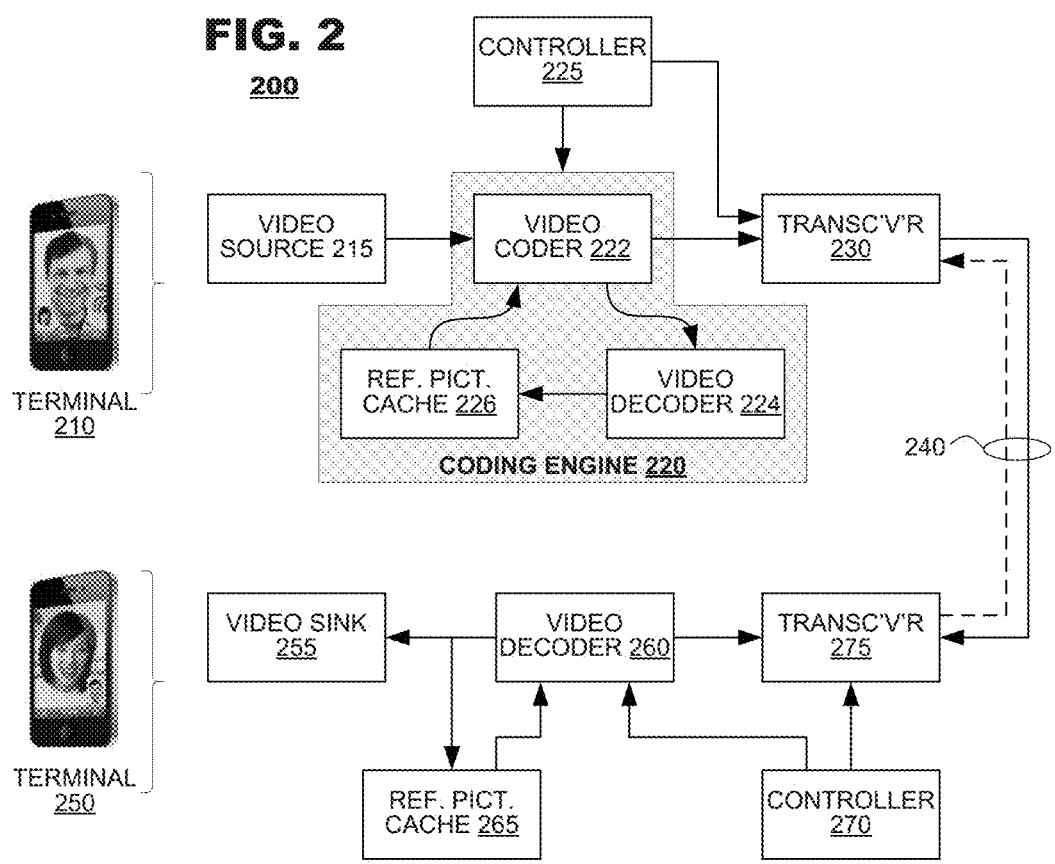
FIG. 2 is a functional block diagram illustrating a system according to an embodiment of the present disclosure.

FIG. 2 is a functional block diagram illustrating a system 200 according to an embodiment of the present disclosure. The system 200 may include a pair of terminals 210, 250 provided in communication via a channel 240.

FIG. 2 illustrates a terminal 210 that includes a video source 215, a coding engine 220, a controller 225 and a transceiver 230. The video source 215 may supply a video sequence to be coded. The coding engine 220 may code the video sequence according to motion compensated prediction, which reduces the bandwidth of the video sequence. The transceiver 230 may transmit coded video data to a channel 240 and, optionally, may receive data from the channel. The controller 225 may manage operation of the terminal 210.

The video source 215 may supply a video sequence to the coding engine 220 that is to be coded. In the example illustrated in FIG. 2, the video source 215 may be a camera that supplies video data captured in a local environment of a terminal. In other applications, the video source 215 may be a storage device that stores video data, for example, data representing audio-visual programming.

The coding engine 220 may include a video coder 222, a video decoder 224, and a reference picture cache 226. The video coder 222 may perform bandwidth compression operations on the video from the video source 215 to reduce spatial and/or temporal redundancies therein. As part of its operation, the video coder 222 also may code new frames of video data according to motion compensated prediction techniques using data stored in the reference picture cache 226 as a prediction reference. The video coder 222 may output coded video data to the transceiver 230, which may format the data for transmission over the channel 240 and delivery to the terminal 250. The video decoder 224 may decode coded video data of reference frames for storage in the reference picture cache 226.

The video coder 222 may code input video data according to a variety of different coding techniques to achieve bandwidth compression. The video coder 222 may compress the images by a motion-compensated prediction. Frames/pictures or sub-units within a picture, such as a slice, of the input video may be assigned a coding type, such as intra-coding (I-coding), uni-predictive coding (P-coding) or bi-predictive coding (B-coding). The frames or slices may be further parsed into a plurality of coding units or pixel blocks and may be coded by predictive and transform coding, quantization and entropy coding. Pixel blocks of I-coded frames/pictures may use intra prediction mechanisms to exploit spatial correlation within the signal. Apart from intra prediction, pixel blocks of P- and B-coded frames or slices may be coded using inter/motion compensated prediction, which exploits temporal correlation within the signal. In this case, the video coder 222 may perform a motion prediction search to identify pictures and areas from within the reference picture cache 226 that may provide an adequate prediction reference for pixel blocks of a new frame to be coded. In B-coded frames or slices, multiple temporal predictions, i.e. up to two, could be combined together to generate a final motion compensated prediction. The video coder 222 may calculate motion vectors identifying pixel blocks of decoded frames stored in the reference picture cache 226 that are used as predictions of the pixel blocks being coded. It may also generate prediction residuals prior to engaging the transform coding. It may also include additional in-loop filtering techniques, such as deblocking, the use of the sample adaptive offset (SAO) technique, or the adaptive loop filtering technique (ALF) to further improve the signal for display and temporal prediction. In an embodiment, the video encoder may operate according to coding protocols defined by ITU H.263, H.264, H.265 and the like.

The coding engine 220 may include a video decoder 224 to decode coded reference picture frames. Thus, the coding engine 220 may generate a local copy of the decoded reference frames that will be obtained by the second terminal's video decoder 250 when it decodes the coded video data (subject to the resource management operations discussed herein). These decoded reference picture frames may be stored in the reference picture cache 226. The reference picture cache 246 may have a predetermined cache depth; for example, coding engine's 220 operating in accordance with H.264 may store up to sixteen (16) decoded reference pictures for frame coding, and up to 32 pictures for field coding.

The controller 225 may manage overall operation of coding processes performed by the coding engine 220. For example, the controller 225 may manage operations of the coding engine 220 both to code the source video and also to estimate opportunities for resource conserving decoding operations as discussed herein.

The transceiver 230 may transmit the coded video data to the channel 240. In so doing, the transceiver 230 may multiplex the coded video data with other data to be transmitted such as coded audio data and metadata, as discussed herein. The transceiver 230 may format the multiplexed data into a format appropriate for the channel 240 and transmit the data to the network.

The second terminal 250 may include a video sink 255, a video decoder 260, a reference picture cache 265, a controller 270, and a transceiver 275. The transceiver 275 may receive coded video data from the channel 240 and, optionally, to transmit data to the channel 240. The video decoder 260 may decode the coded video data by inverting coding operations applied by the video coder 222. The reference picture cache 265 may store decoded reference picture data. The video sink 255 may consume the video data. The controller 270 may manage operations of the terminal 250.

The video decoder 260 may perform decoding operations that invert coding operations performed by the video coder 222. The video decoder 260 may perform entropy decoding, de-quantization, and transform decoding to generate recovered pixel block data. Quantization/de-quantization operations are lossy processes and, therefore, the recovered pixel block data likely will be a replica of the source pixel blocks that were coded by the video coder 222 but include some error. For pixel blocks coded predictively, the transform decoding may generate residual data; the video decoder 260 may use motion vectors associated with the pixel blocks (which may be implied in some cases) to retrieve predicted pixel blocks from the reference picture cache 265 to be combined with the prediction residuals.

The controller 270 may manage operation of the video decoder 260. The controller 270 may enforce resource conservation policies that may govern operation of the terminal 250. In doing so, the controller 270 may cause the video decoder 260 to alter decoding operations from those that ordinarily would be applied through a straightforward decode of coded video data that is received from the channel 240. For example, the controller 270 may cause the video decoder 260 to alter deblocking operations (discussed below) from the deblocking operations that are identified in coded video data. In certain embodiments, the controller 270 may cause the terminal 250 to transmit messages to terminal 210 identifying alternative coding operations that were applied by the video decoder 260. These messages could be transmitted within the video signal, e.g., using a Supplementary Enhancement Information (SEI) message, or using other mechanisms such as within a transport layer or within another side channel that is also transmitted to the decoder at the same time as the video bit stream.

Figure 3:
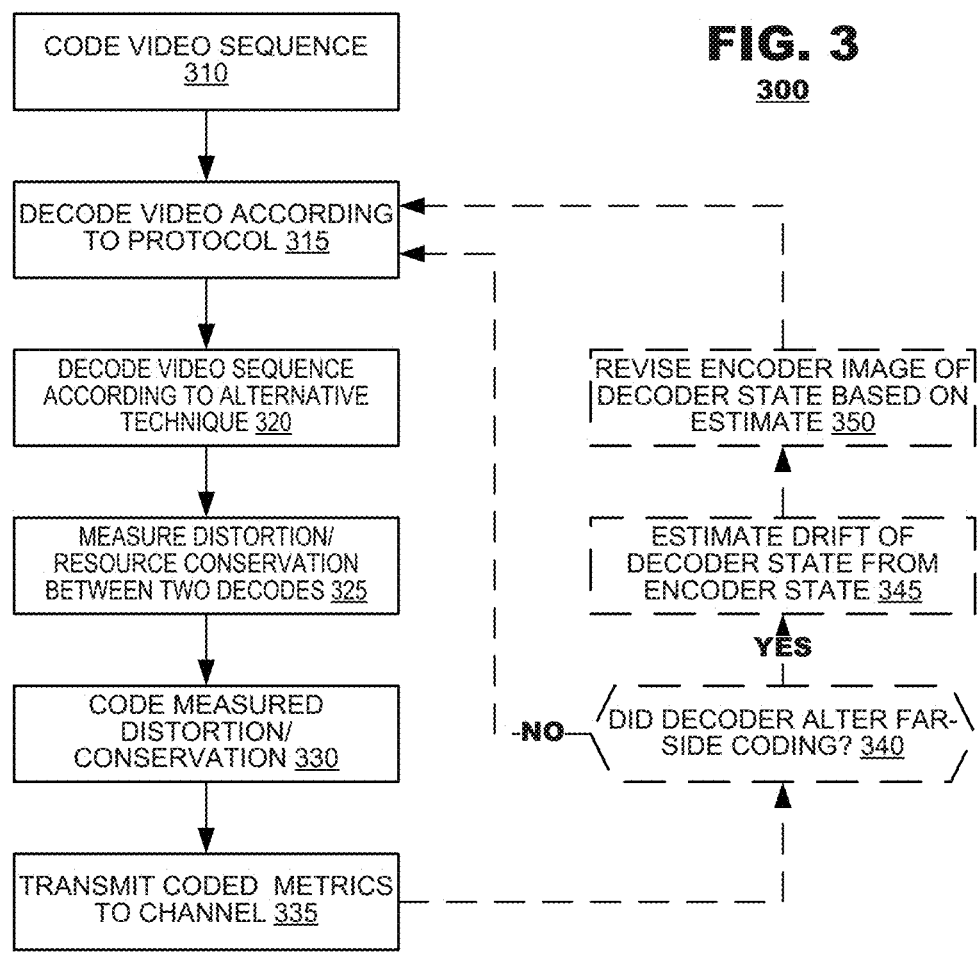
FIG. 3 illustrates a method according to an embodiment of the present disclosure.

FIG. 3 illustrates a method 300 according to an embodiment of the present disclosure. The method 300 may be performed by an encoding terminal during the course of a video coding session. According to the method 300, a video sequence may be coded according to a governing coding protocol (box 310). The method 300 may decode the coded video sequence according to the governing coding protocol (box 315). The method 300 also may decode the coded video sequence according to an alternate decoding technique (box 320). The method 300 may measure distortion and/or resource conservation induced by the alternate decoding technique as compared to the protocol-mandated decode (box 325). The method 300 may code the measured distortion/resource conservation according to a predetermined metric (box 330). Thereafter, the method 300 may cause the coded metric(s) to be transmitted to a channel (box 335).

During operation, the operations of boxes 320-335 may be replicated for as many alternative coding techniques as may be desired. Thus, an encoding terminal may provide a variety of coded metrics to a channel that identify opportune moments for a decoder to engage an alternative coding technique.

In one embodiment, an encoding terminal may receive communication from a decoding terminal indicating that the decoding terminal has engaged an alternative decoding technique. Invocation of an alternative decoding technique may cause loss of synchronization between the state of the decoder and the encoder's image of the state of the decoder. In such an embodiment, the method 300 may determine whether the decoder altered its decoding operation to employ an alternative decoding technique (box 340). If so, the method 300 further may estimate "drift" between the decoder's state from the encoder's image of that state (box 345) and revise the encoder's image of the decoder state based on this estimate (box 350).

If no indication was received that the decoder altered its decoding from the decoding operations mandated by the coding protocol, then, of course, the operations of boxes 345 and 350 can be omitted.

In box 350, the encoding terminal may perform operations that emulate decoding operations that were performed by the decoder and update its image using results of the emulation. For example, if the encoder received an indication that a decoder either skipped performance of deblocking operations or used an alternate type of deblocking other than what was mandated by the coded video data, then the decoder may generate decoded video data (including decoded reference frames) that differ from the decoded video data that was generated by the encoder. The contents of the encoder's reference picture cache 226 (FIG. 2) and the decoder's reference picture cache 265 may be different. The encoder's emulation operation, however, may generate new decoded video data that matches (or, at least better approximates) the decoded reference picture data that was obtained by the decoder. The encoder may update its reference picture cache 226 with the newly decoded data.

Figure 4:
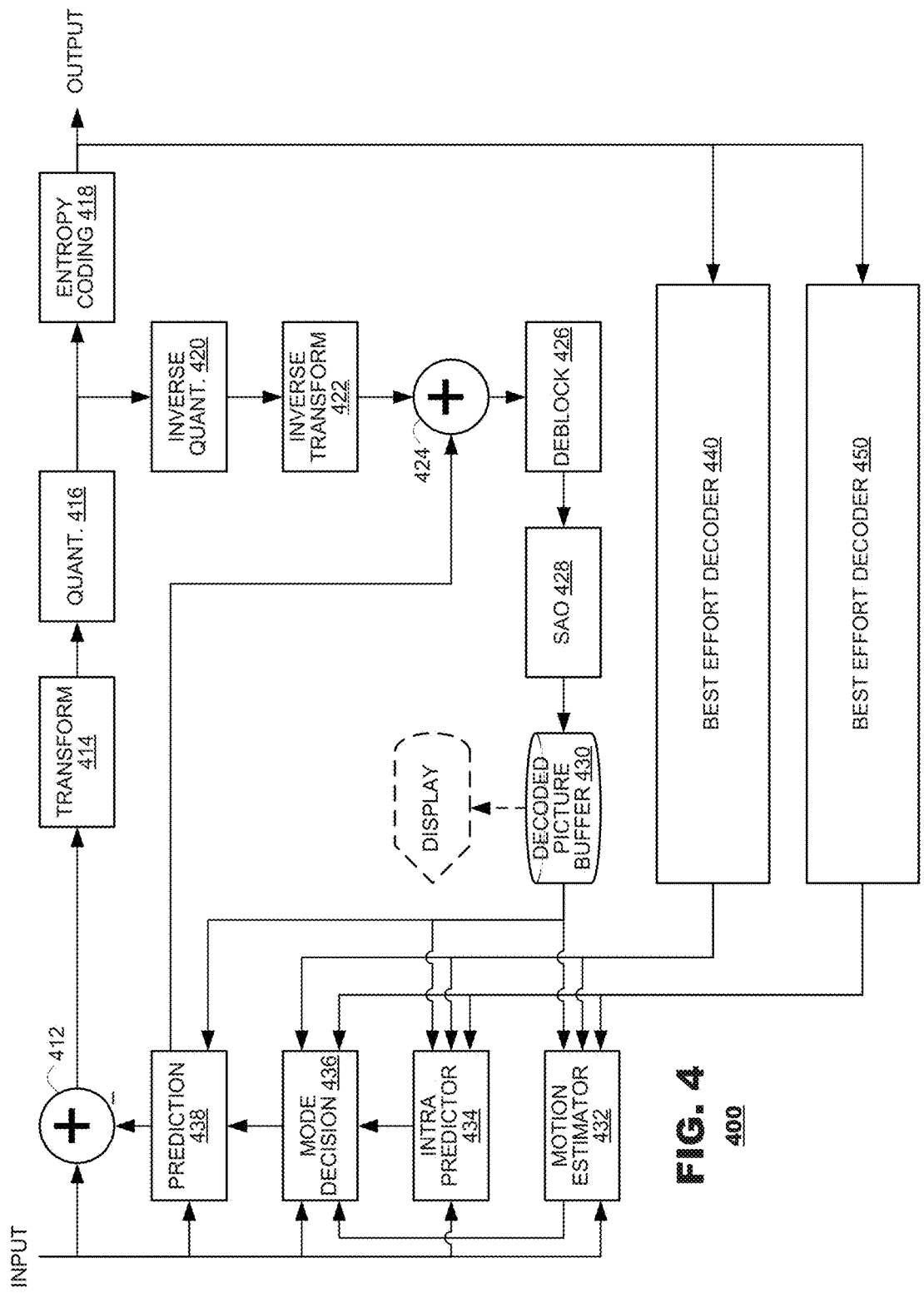
FIG. 4 is a functional block diagram of an encoder according to an embodiment of the present disclosure.

FIG. 4 is a functional block diagram of an encoder 400 according to an embodiment of the present disclosure. The encoder 400 may include a subtractor 412, a transform unit 414, a quantizer 416 and an entropy coder 418. The subtractor 412 may generate pixel residuals from a comparison of input video data and video data generated by a prediction unit 438. The transform unit 414 may perform a transform (such as a discrete cosine transform or a wavelet transform) of pixel residuals. The quantizer 416 may downscale transform coefficients by quantizer parameters (not shown). The entropy coder 418 may perform entropy coding of the quantized transform coefficients. The entropy-coded coefficients may be output from the encoder 400 as part of coded video data, along with indicators of their respective quantizer parameters.

The encoder 400 also may include, as part of its decode circuitry, an inverse quantizer 420 an inverse transform unit 422 and an adder 424. The inverse quantizer 420 may invert quantization operations performed by the quantizer 416. The inverse transform unit 422 may invert transform operations performed by the transform unit 414. Thus, transform coefficients may be converted back to pixel residuals. The adder 424 may add prediction video data to prediction residuals obtained by the inverse transform unit 422.

The operations of the quantizer 416 and the inverse quantizer 420 typically are lossy processes. Therefore, transform coefficients output from the inverse quantizer 420 likely will exhibit losses with respect to the transform coefficients as they were input to the quantizer 416. These losses may propagate throughout other components of the encoder 400.

The encoder 400 also may include a deblocking filter 426, a sample adaptive offset filter ("SAO") 428, a decoded picture buffer 430, a motion estimator 432, an intra predictor 434, a mode decision unit 436, and a prediction unit 438. The deblocking filter 426 may perform deblocking operations on image data output from the adder 424. The SAO filter 428 may perform filtering on data output from the deblocking filter 426. The decoded picture buffer 430 may store decoded pictures output from the SAO filter 428. The decoded picture buffer 430 may store all decoded pictures if desired, for example, to estimate coding quality or, alternatively, it may store only the reference pictures that may be used for later prediction operations. In this latter case, the decoded picture buffer 430 may operate as a reference picture cache 226 (FIG. 2). The motion estimator 432 may perform a motion estimation search between an input image and stored reference pictures for purposes of inter prediction coding. The intra predictor 434 may perform intra prediction searches between an input image and previously-coded content of the same image for intra prediction coding. The mode decision unit 436 may select a coding mode (e.g., inter prediction, intra prediction, no coding (skip)) for a new element of input video. The prediction unit 438 may supply prediction data for use in coding the new element of input video according to the selected mode.

During operation, the coded video data may include indicators identifying selected parameters for the deblocking and SAO filters 426, 428, and/or other in-loop filter mechanisms that may exist within the codec, as well as the prediction mode selected for coding and parameters (ex.: motion vectors) for the selected prediction mode.

The foregoing discussion illustrates coding elements that are common to many coding protocols. Different coding protocols may represent these elements with terminology that is different from the terminology listed herein. Some coding protocols may omit one or more of these elements.

The foregoing description, however, is merely explanatory and provides context for discussion of best effort decoders, as described below.

As illustrated in FIG. 4, an encoder 400 may include one or more "best effort" decoders 440, 450 that may perform decoding processes that are different than those mandated by a governing protocol. Coding operations may vary, for example, by altering prediction modes, altering filtering types or other coding decisions as discussed below.

Best effort decoders need not be integrated with coding-based protocols as shown. In other embodiments, best effort estimates may be generated by a post-encoder stage (not shown) that follows an encoder. Such a system may contain one or more decoders to estimate complexity as well as distortion. Furthermore, in terms of the distortion computation, distortion could be computed with reference to the original encoded stream (how far does an alternative decoding operation deviate from it), or could use source video data (or perhaps a higher bitrate/quality bit stream, if such is available, such as in the case of adaptive streaming where multiple different versions of a video sequence are available at different bitrates and/or resolutions).

Moreover, best effort estimates may be developed for multiple bit streams that were previously-encoded by different encoders. These bit streams may be passed to a post-encoder/complexity analysis system that performs the complexity/distortion analysis and metadata generation.

During a video coding session, an encoding terminal 210 (FIG. 2) may provide identifiers in metadata that estimate levels of distortion and/or levels of resources conserved for one or more alternative decoding operations that may be performed by a decoder. The encoder may generate its estimates by decoding coded video data output from the video coder 222 according to a variety of different decoding operations. In this mode of operation, the controller 225 may configure the video decoder 224 to decode the coded video data according to the alternative decoding operations, in a manner that deviates from the coding techniques that are mandated by the coding protocol to which the video coder 222 operates. Indeed, the video decoder 224 may decode the coded video data according to a plurality of decoding techniques, both those mandated by the coding protocol and one or more alternative decoding techniques that are candidates to be performed by a decoder. The controller 225 may estimate levels of distortion from a comparison of the resultant video data obtained from the protocol-mandated operation and from the alternative operation. Moreover, the controller may estimate levels of resource conservation by observation of the video decoder 224 under these different configurations.

A decoding terminal 250 may refer to these identifiers when determining when to engage alternative decoding operations as may be warranted under its resource conservation policies. By referring to such identifiers, the decoding terminal 250 may engage the alternative decoding operations when operating circumstances indicate it would be advantageous to do so (e.g., the distortions induced would be relatively low or the resource savings would be relatively high).

In a particular embodiment an encoder may operate in a special "encoding with losses" mode. Such techniques have been utilized before in the context of error resiliency where it was assumed that the encoder would have to deliver a bit stream through an error prone channel. In that scenario, the encoder can try to emulate the channel during encoding and make encoding decisions that would help, on average, to constrain the propagation of errors due to losses. In a particular example, an encoder may try to maintain N number of different decoders each one potentially impaired at random (but different) intervals by the losses in the channel. By maintaining these decoders, the encoder could estimate the distortion introduced in each one due to the channel losses, and by computing the average distortion for each one during mode decision select the modes that would likely control quality drift due to losses in the most efficient manner possible. Other techniques, such as the ROPE technique proposed by Kenneth Rose of UCSB, have been proposed as alternative methods.

Best effort decoding, such as adjusting deblocking, could itself be considered as somewhat similar. An encoder could employ multiple decoding modules, one following a complete, normative decoding process, as well as other decoders that could operate in a best effort decoding mode and may try to make best effort decoding decisions based on a variety of different criteria (e.g., given a battery usage model, software or hardware implementation, environmental parameters, etc.). A cost/pricing model on the priority of these decoders may also exist. For each one of these decoders a distortion and complexity measurement is taken based on its best effort decoding decisions, and given also the cost model, these are appropriately accumulated with the distortion and cost of the normative decoder for every encoding decision of the encoder (e.g., a MB, CU, or CTU coding mode, motion vectors, intra mode prediction, etc.). These criteria, as well as the resulting bitrate for the encoding decision, are then considered by the encoder to make the "best" encoding decision that would enable the best performance across all decoders. Complexity can be considered in the encoder by using a joint rate-distortion-complexity mode decision model. For example, lagrangian optimization could be used where mode decision is now employed using a formulation of the type:

$$J = D + \lambda_0 * R + \lambda_1 * C,$$

where D corresponds to a distortion measurement, potentially joint across multiple best effort decoders as well as normal decoders as described herein, R is the rate of encoding this mode, C the average complexity costs across all decoders, and lambda0 and lambda1 represent the lagrangian multipliers corresponding to rate and complexity, respectively. This can better help in reducing and controlling drift due to best effort decoding. Using this model the encoder guarantees that the encoding performance and quality of the bit stream across all decoders would be best, on average, across all possible decoding paths instead of being optimal, for the normative, no-loss, decoding process, while also trying to maximize the potential complexity reduction benefits of best effort decoding.

In one embodiment, given N candidate decoders, a selection criterion may be applied that calculates an optimization factor J according to:

$$J = \sum_{n=0}^{N} (w_d[n] * \lambda_0 * \text{dist}[n] + w_c[n] * \lambda_1 * \text{comp}[n]) + \lambda_2 * \text{bitrate},$$

where dist[•] and comp[•] respectively represent distortion and complexity estimates associated with the candidate decoders, wd[•] and wc[•] respectively represent weights assigned to the distortion and complexity estimates associated with the candidate decoders, and $\lambda_0$, $\lambda_1$, and $\lambda_2$ are lagrangian multipliers.

During operation, an encoder may cycle through all appropriate coding modes that are supported by the system and may select the one that minimizes the optimization factor J. Modes could be, for example, the skip mode, 16×16 inter predicted coding units, 8×8 inter predicted coding units, 16×8 inter predicted coding units, 8×16 inter predicted coding units, intra predicted coding units, etc., in the mode decision case. In the motion estimation case, the encoder may test different motion vectors.

In one example, an encoding terminal 210 (FIG. 2) and a decoding terminal 250 may exchange information regarding candidate deblocking operations. Metadata "hints" can be provided to the decoder to make a more informed decision of when to disable or alter the deblocking process compared to what is expected by the coded video data. The encoding terminal 210 may generate the metadata within the video coder 222 or in a post-encoder process (not shown), given the availability of the original content. The metadata can be based on measurements about the quality as well as the complexity/power reduction impact a change in process may achieve. An encoder, for example, can measure quality with and without deblocking for a picture, measure and analyze any temporal degradation as well as complexity, and then, based on a combined distortion-complexity cost, provide a signal, or even a cost metric to the decoder to assist on the decision.

The metadata hints may be provided to a decoding terminal 250 in a variety of formats. In one embodiment, the metadata hints can be provided in an Supplementary Enhancement Information (SEI) message, within the system's layer, or in some other side channel, as binary flags associated with each picture that indicate whether it is "safe" to disable the deblocking process or not. In another embodiment, the hints may be based on a scaled metric (e.g., "recommended" to skip, "ok" to skip but with some quality degradation, "moderate degradation" may occur that may be somewhat objectionable if skipping were engaged, "not recommend" to skip). In further embodiments, the metadata hints may provide explicit information about quality impact, for example, degradation in terms of a difference between mean squared error and/or peak signal to noise ratio (MSE/PSNR) or degradation measured using some other metric such as the structural similarity index ("SSIM"), the NTIA Video Quality Model ("VQM"), the Digital Video Quality ("DVQ") metric or others.

In another embodiment, the metadata hint may identify an expected complexity impact (e.g., ~20% complexity savings). Complexity savings can be quite different from one device to another given different implementations and architectures, such as the use or not of simple instruction, multiple data ("SIMD") operations, the availability of parallel blocks, etc. Thus, the metadata hint may be based on a single reference platform, or alternatively, it may contain multiple such entries each tied to a different architecture (e.g., a first complexity indicator for a single decoder and a second complexity indicator for a parallel decoder). Where a metadata hint refers to a single reference platform, a decoding terminal 250 (FIG. 2) may derive resource conservation estimates based on operational differences between the decoding terminal 250 and the reference platform. Where multiple complexity hints are provided, the decoding terminal 250 can select the appropriate complexity entry when making its best effort decoding decision. A decision can also involve combining such numbers, for example, where a decoding terminal 250 uses a "hybrid" architecture (e.g., different components are parallelized versus those in the reference decoder(s), or there exist different types of optimization on other components that have been estimated to commonly provide different complexity ratios versus the overall decoding process compared again to the references).

Identification of distortion and complexity can be combined through the use of various optimization methods such as the use of lagrangian optimization, augmented lagrangian optimization, heuristic methods, evolutionary algorithms, stochastic optimization and others.

In other embodiments, power savings can be achieved by modifying deblocking processes rather than skipping them. For example, the deblocking process in HEVC is considered simpler than that of AVC since it utilizes shorter and simpler filters, especially for chroma, and is more suitable for parallelization. An AVC decoder, for example, can select to use, given appropriate metadata signaled by the encoding terminal 210 (FIG. 2), the HEVC deblocking method instead. Hints of which other deblockers to use, if available, can be provided in the metadata that may include an estimate of their resulting degradation and complexity impact. The decoder can then select the best deblocking scheme available that most closely matches the ones described in the metadata. Selection of whether and how to deblock can be performed independently in different color components. For example, the protocol-driven deblocking process may be performed on luma information, but a simplified deblocking process (or no deblocking) may be performed on the chroma (Cb or Cr) components.

In another embodiment, a decoder may make different selections for different regions (one or more) of a coded image. These regions can be specified by the metadata hints, and either may remain fixed throughout a predetermined portion of a video sequence, or they may change in number or position from image to image. In such case, the number and position information may also be available in the metadata, or the metadata can specify additional conditions of how to derive those regions. As one example, the metadata can suggest that deblocking operations should be retained for all intra blocks as well as for motion vectors that are larger in magnitude than a particular value or have a particular orientation. The amount of energy in the residual signal can also be used for this determination. As another example, different regions may be identified based on image content, for example, regions having moving image content versus other regions having non-moving image content or regions that are identified to have predetermined objects (e.g., faces) within them and other regions that do not have these objects. In a further example, different regions may be assigned to predetermined regions of images (for example, center portions of the image). Moreover, regions may be aligned to other constructs that are identified by governing coding protocols, such as slices or tiles. In all of these examples, different metadata hints may be provided for these different regions.

A decoder also may utilize its own resources to make decisions whether to alter decoding operations. In particular, the decoder can perform a partial decoding of an image, e.g., a few lines of Macroblocks (MBs) or coding tree units (CTUs) in the context of AVC and HEVC respectively, perform standard decoding for these lines and estimate the amount of changes introduced by this process to the signal versus performing an alternate decoding operation. If these are significant, then the decoder can decide to proceed with deblocking for all other MBs or CTUs, or skip it completely. Note that since the original signal is not known at this stage, the decoding terminal's estimate may not provide a precise degradation impact. Nevertheless, it is expected that such changes would be of an additive nature. If these are significant, then it is likely expected that also the degradation would be of a significant nature. If small, then likely the degradation would also be small. Even though this process may introduce a slightly higher complexity at the beginning of the decoding process, average savings can be higher while making a more informed decision for the use or not of best effort decoding mechanisms.

In a particular embodiment, an encoder may also employ the same strategy, i.e. while encoding a certain number N of MB or CTU lines, examine what the distortion impact would be for these lines with and without deblocking. At the same time an encoder may estimate, using a "reference" decoder for the complexity savings without deblocking, for just these lines. In the end the encoder also may compute the distortion impact and complexity benefits, using this reference decoder, for the entire picture. By transmitting both types of information, N-line level and full picture level, a decoder such as the one described above could be able to get a more accurate estimate about its own complexity savings after decoding only N lines with and without deblocking. This can be done, for example, by appropriately modulating the N-line complexity numbers computed in the current decoder (CN), using the N-line and total complexity numbers computed for the reference decoder (CN_r and Co_r, respectively) in the encoder stage. As an example, the computation for the overall complexity Co could be computed as follows:

$$Co=CN*Co\_r/CN\_r$$

Considerations of the different subcomponents of the decoding process, such as cycles spent on motion compensation, intra prediction, deblocking, inverse transform, and inverse quantization among others, could also be extracted at both encoder and decoder and provided in metadata form to the decoder for more accurate estimation of complexity.

Best effort decoding need not be restricted to only non-reference pictures. Best effort decoding, and in this example reduction of the complexity of the deblocking process through either skipping or altering, can also be used on reference pictures. In this scenario the provided metadata can inform the decoder not only about the quality impact on the current picture but also on subsequent pictures that depend on this picture and on when that impact terminates. An encoder, in particular, may know already when the next random access point (e.g., an open or closed group of pictures (GOP)) would start, and that information can be provided to the decoder. Reference pictures that are very close to the end of a GOP, in decoding order, likely would propagate any degradation in their quality due to best effort decoding far less than pictures at the beginning of the GOP. It is also possible because of certain types of motion or other changes in the scene that there may be little if any propagation of the degradation from one picture to the next. Also, at very high bitrates, deblocking may have very little impact on the overall image quality and even though signaled and used during decoding, can be safely skipped even for reference pictures. The use of a simpler deblocker may also be more effective quality- and complexity-wise than skipping it altogether for some pictures. Having such information available at the decoder can provide even more complexity savings, while keeping quality degradation and drift in check. Metadata can again involve an overall quality cost (average across all pictures impacted) and complexity impact, or can also involve information about each picture in isolation as well as information about quality degradation if deblocking is altered or not for any subsequent dependent pictures. To be more exact, if a picture k depends on a picture m, the quality degradation of disabling or altering deblocking on the picture k would be different if a similar decision was made on picture m versus retaining the original decision and process on that picture. Regional and/or per color component deblocking considerations can be made for reference pictures as well.

The principles of the present disclosure are not limited to providing hints to decoders to identify opportunities to engage alternate deblocking processes. The principles of the present disclosure may be extended to other decoding processes, such as:

Frame dropping. Although other coding protocols permit frame dropping, it can result in jitter/flicker artifacts if not done intelligently. Metadata can provide hints of when it is "safe" to drop decoding of an entire frame or possibly a slice or tile.

Transform block reduction/simplification. Inverse transform/quantization of sparse transform prediction blocks can be substantially sped up by considering how sparse the block is. Although other coding protocols permit a decoder to discard some non-zero high frequency coefficients, this can result in both spatial and temporal artifacts depending on how (and if) the resultant block is used for prediction. Metadata can provide hints of when it is "safe" to discard transform coefficients of coded video. In certain embodiments, a decoder's decision to implement this technique may be biased towards chroma data, which has a higher likelihood for sparseness. Which transform coefficients and under which conditions can be discarded can also be indicated within the metadata.

Interpolation simplification. The AVC standard uses a 6 tap (half-sample positions) followed by a bilinear filter (quarter-sample positions) for interpolation of luma sub-pixel positions. HEVC uses an 8 tap filter. Metadata can provide hints of when it is "safe" to use simpler filters (e.g., bilinear only) instead of the filters mandated by the coding protocol. Similar considerations could be made for chroma components.

Sub-sample position truncation. Instead of interpolating a prediction sample at full precision (e.g., quarter sample), a truncation of the sub-sample vector is performed to half or even integer precision. Metadata can provide hints of when it is "safe" to use this technique based upon estimates prepared by a video decoder 224.

Partition grouping. Instead of motion compensating smaller blocks (e.g., 8×8 or smaller) with their precise motion vectors, adjacent blocks are grouped together and assigned a single motion vector. Then data are fetched for all blocks from a contiguous area. Metadata can provide hints of when it is "safe" to use this technique based upon estimates prepared by a video decoder 224.

Intra prediction restrictions. Not recommended, but a decoder can restrict some intra prediction modes and reassign them to other, simpler modes. Although this technique is likely to introduce artifacts, an encoding terminal 210 may estimate artifacts that would be induced by the technique and provide metadata hints that identify levels of distortion that would be incurred if a decoder performed such techniques.

Bitdepth restrictions. When presented with an N-bit bit stream (N>8), the decoder may restrict decoding of a frame or more to 8-bit decoding only. Metadata can provide hints of when it is "safe" to use this technique based upon estimates prepared by a video decoder 224.

Sample Adaptive Offset (SAO) techniques. SAO is included as an in-loop filter process after deblocking in HEVC (and its various extensions).

Adaptive Loop Filtering (ALF) techniques. ALF, although not currently included in any version of HEVC, is a candidate for inclusion in future codecs or standards. An ALF scheme could include a variety of filters that are used to reduce artifacts in a picture for reference and/or display and are not restricted in only catering for blockiness artifacts.

Compression of Decoded Reference Pictures. A decoder may compress decoded reference pictures according to a lossy compression technique, then decompress the compressed reference picture if invoked by later received coded video data. This embodiment is discussed in more detail below.

Figure 5:
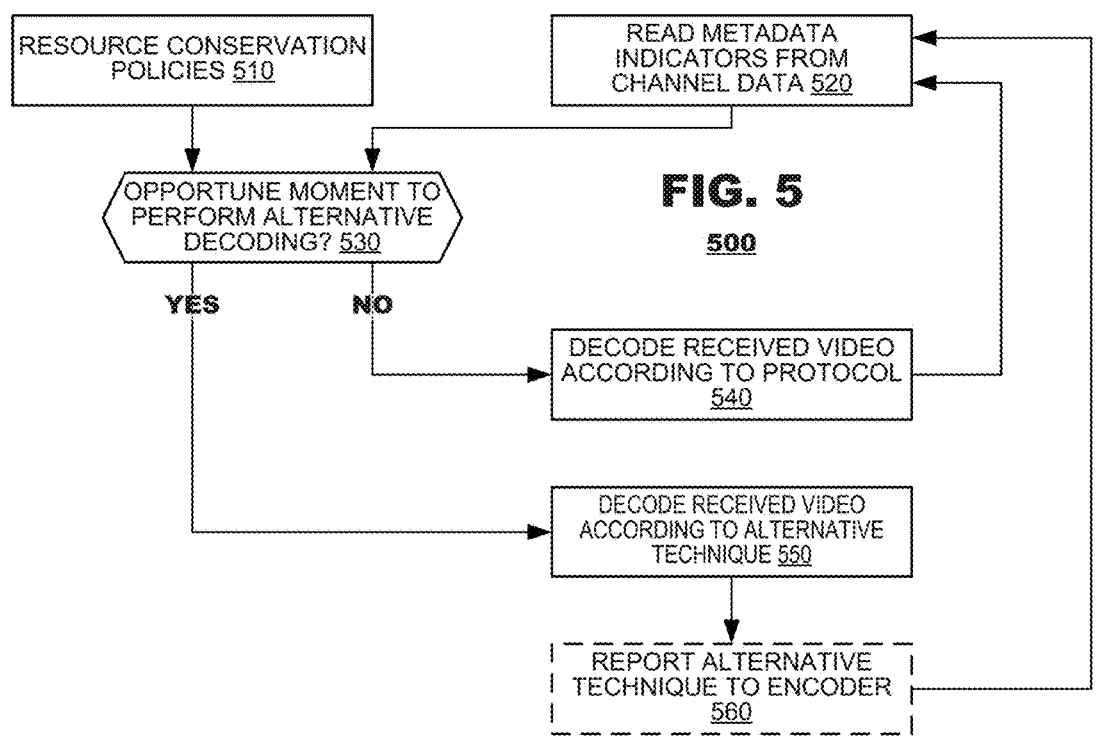
FIG. 5 illustrates a method according to an embodiment of the present disclosure.

FIG. 5 illustrates a method 500 according to an embodiment of the present disclosure. The method may be performed by an encoding terminal during the course of a video coding session.

The method 500 may operate in accordance with a resource conservation policy (represented by box 510) that may identify resource limits under which the decoding terminal must operate and/or counterbalancing decoding quality performance that must be achieved. During operation, the method 500 may read metadata hints from coded video data that it received via the channel (box 520). The method 500 may determine, from the metadata hints and its own local operating parameters, whether a given instant of decoding represents an opportune moment to perform an alternative decoding operation (box 530). If the method 500 determines it is not an opportune moment to invoke alternative decoding techniques, the decoding terminal may decode the received video according to the coding protocol (box 540). If the method 500 determines that it is an opportune moment to invoke alternative decoding techniques, the decoding terminal may decode the received video according to those techniques (box 550).

As discussed, the decoder may consider the metadata hints that are presented by the encoder in conjunction with determinations that it makes locally to estimate resource conservation and/or distortion. For example, a decoder may decode a portion of an image according to both techniques—the protocol-mandated techniques and a candidate alternative technique—to estimate what level of resource conservation and/or distortion likely would occur if an alternate decoding technique were used. The decoder also may consider the history of its operation, to assess whether previously received estimates of resource conservation and/or distortion were accurate when the decoder attempted to invoke alternative decoding techniques.

In an embodiment, when a decoding terminal invokes an alternative decoding technique, the method may cause the decoding terminal to transmit a message back to the encoder reporting use of the alternative coding technique (box 560).

Figure 6:
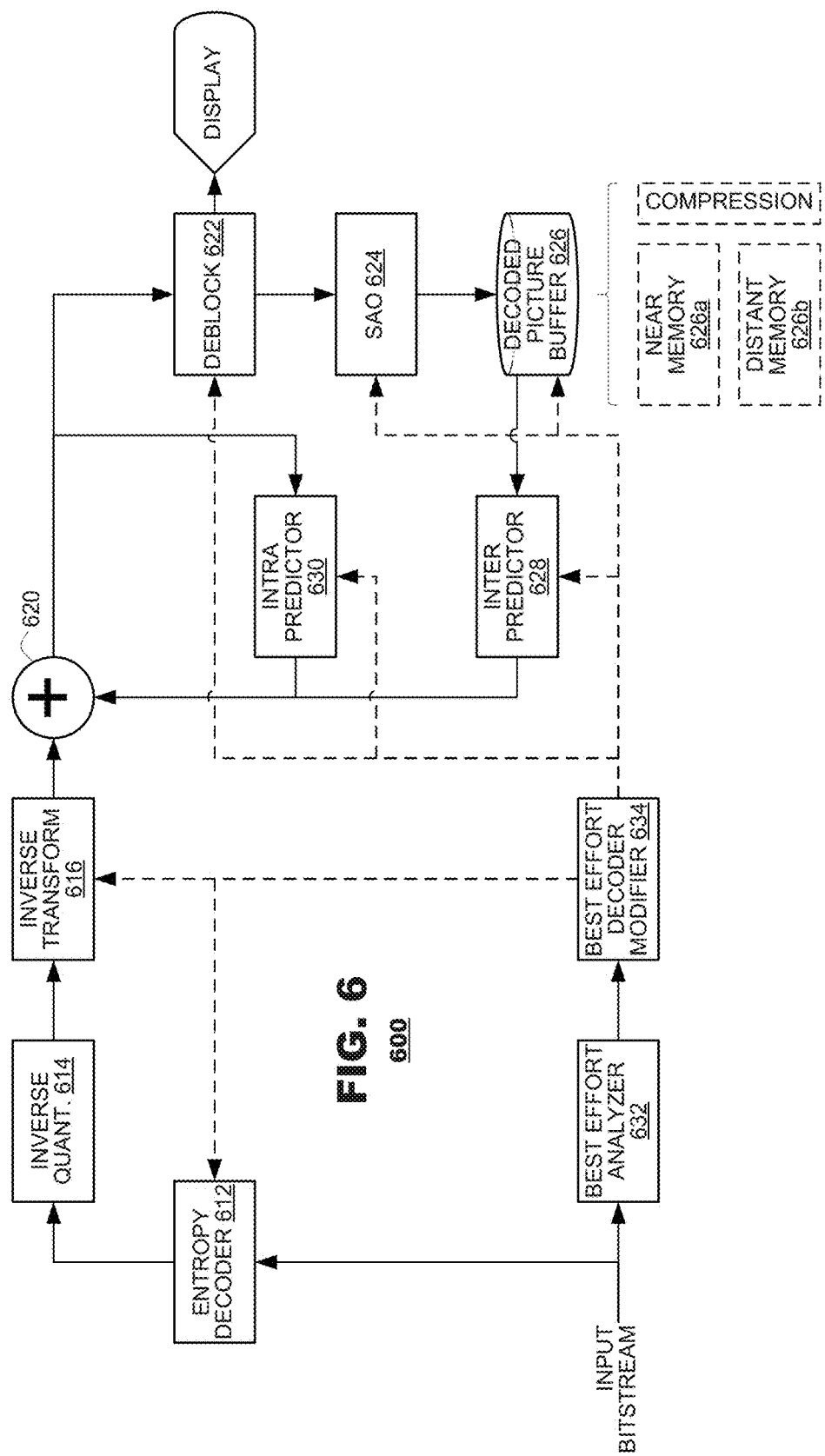
FIG. 6 illustrates a best effort decoder according to an embodiment of the present disclosure.

FIG. 6 illustrates a best effort decoder 600 according to an embodiment of the present disclosure. The decoder 600 may include an entropy decoder 612, an inverse quantizer 614, an inverse transform unit 616, an adder 620, a deblocking filter 622, a sample adaptive offset filter 624, a decoded picture buffer (DPB) 626, an inter predictor 628, an intra predictor 630, a best effort metadata analyzer 632, and a best effort decoder modifier 634.

The entropy decoder 612, inverse quantizer 614, inverse transform unit 616 and adder 620 may invert coding operations that were applied by an encoder to generate coded video data from a video sequence. Specifically, the entropy decoder 612 may perform entropy decoding of coded residual data that may be present in the input bit stream. The inverse quantizer 614 may invert quantization operations performed by an encoder quantizer as indicated by the quantization parameters present in the input bit stream. The inverse transform unit 616 may invert transform operations performed by an encoder's transform unit. The inverse transform unit 616 may generate recovered pixel residuals from coefficient data. The adder 620 may add prediction reference data supplied by either the inter predictor 628 or the intra predictor 630 to prediction residuals obtained by the inverse transform unit 616.

The deblocking filter 622 may perform deblocking operations on image data output from the adder 620. Decoded video data generated by the deblocking filter 622 may be output from the decoder 600 to a display or other device that will consume the video data.

The sample adaptive offset filter 624 to perform filtering on data output from the deblocking filter. Decoded pictures output from the SAO filter 624 may be stored in the decoded picture buffer 626. The decoded picture buffer 626 may store only the reference pictures that may be used for later prediction operations and may operate as a reference picture cache 265 (FIG. 2).

The prediction units may predict video data for coded video data that is being decoded. An inter predictor 628 may perform inter prediction from the decoded picture buffer 626 according to prediction references contained in the input bit stream. The intra predictor 630 may perform intra prediction using previously coded content of the same image subject to coding. Metadata in the input bit stream may identify a coding mode that was used to generate the coded video data which may determine whether inter prediction or intra prediction is to be used for decoding.

The best effort metadata analyzer 632 may interpret metadata hints contained in the input bit stream, which may indicate candidate alternative decoding techniques that may be used by the decoder 600. The best effort decoder modifier 634 may invoke alternative coding techniques for the intra predictor 630, inter predictor 628, deblocking filter 622 and/or SAO filter 624 based on the decoder's 600 resource conservation policies and interpretation of the metadata hints as reported by the best effort metadata analyzer 632.

In other embodiments, best effort decoding also may be performed by a transcoder that decodes coded video data, then recodes the decoded video according to a different set of coding parameters (for example, different coded bit rate or different resolution) or using a different coding protocol.

FIG. 6 illustrates a functional block diagram of a video decoder 600. In practice, such video decoders commonly are provided by hardware or software-based coding systems that embody the functional units as illustrated. For example, the decoded picture buffer 626 may be provided by a memory system of a video decoder, which may involve a plurality of memory units working collaboratively. In one implementation, part of a decoded picture buffer 626 may be resident in a local cache of a processing device but another portion of the decoded picture buffer 626 may be resident in either main memory or a long term storage device that the processing device accesses. Thus, the processing device may incur different costs to read data from a near memory device 626a than to read data from a distant memory device 626b. Moreover, decoded reference pictures that are stored in one or more of these memory devices 626a, 626b may be compressed prior to storage. Compression may reduce the storage requirement and bandwidth consumption that are incurred as reference pictures are accessed during decoder operation. The compression is performed solely within the decoded picture buffer 626 system and the compressed pictures may be decompressed before being used to decode other coded pictures. The compression, if employed, should be lossless, i.e. introduce no additional distortion to the reference picture, in order to avoid any potential mismatch between the encoder and decoder.

In one embodiment of the present disclosure, it is proposed that a decoded picture buffer employ a lossy compression scheme to store decoded reference pictures. When the compressed reference pictures are decompressed, the reference pictures may exhibit some distortion as compared to the reference pictures when they first were decoded. It may occur that reference pictures of one portion of the decoded picture buffer (say, the distant memory 626b) may be stored in compressed form whereas reference pictures stored in another portion of the decoded picture buffer 626 (say, the near memory 626a) may not be stored in compressed form. An encoder may not be informed which decoded reference pictures may exhibit distortion and which others do not and, therefore, may select reference pictures for use in coding new frames based on an assumption that, in the absence of transmission errors, the decoder stores decoded reference pictures without any additional distortion.

In an embodiment, a decoder's decision whether or when to compress a decoded reference picture prior to storage may be augmented by hints provided by an encoder. For example, an encoder may provide hints in channel data that indicate whether a given reference picture is likely, less likely, or unlikely to be used as a source of prediction for other frames. In one embodiment, the hint may be represented by a flag or signal that represents a priority level to be assigned to the picture (for example, high priority or low priority) and an identifier of the picture to which the priority level is assigned. In response to the hint, the decoder may elect to compress a decoded reference picture (or not) prior to storage.

Exemplary lossy compression operations to be performed by a decoded picture buffer 626 may include JPEG/JPEG-2K compression, bitdepth reduction, chroma downsampling, fractal coding, and/or wavelets. Moreover, lossless compression operations may be performed on other reference pictures where a decoder determines that lossy compression should not be performed. Exemplary lossless compression operations may include JPEG-LS, PIZ, RLE and ZIP compression.

An encoder may employ pre-analysis that surveys a predetermined number of input frames (say, 50 frames) and searches for similarities among them. It may designate predetermined frames to be coded as reference frames and, based on similarities between the reference frames and the other frames in the surveyed sequence, may determine further which of the reference frames are likely to serve as prediction sources for the other frames. Oftentimes, the likelihood that a given reference frame will serve, and how often, as a prediction reference diminishes as the temporal distance increases between the reference frame and the frames being coded. If an encoder determines that a given reference frame has strong correlation to one or more input frames notwithstanding a relatively large temporal distance between them, the encoder may provide a hint in the channel designating the reference frame as a high priority frame. The converse also may be performed; if an encoder determines that a given reference frame has low correction to other input frames notwithstanding a relatively small temporal distance between them (which may occur as a result of a scene change or high activity), then the encoder may provide a hint in the channel designating the reference frame as a low priority frame. Other permutations are permissible.

Figure 7:
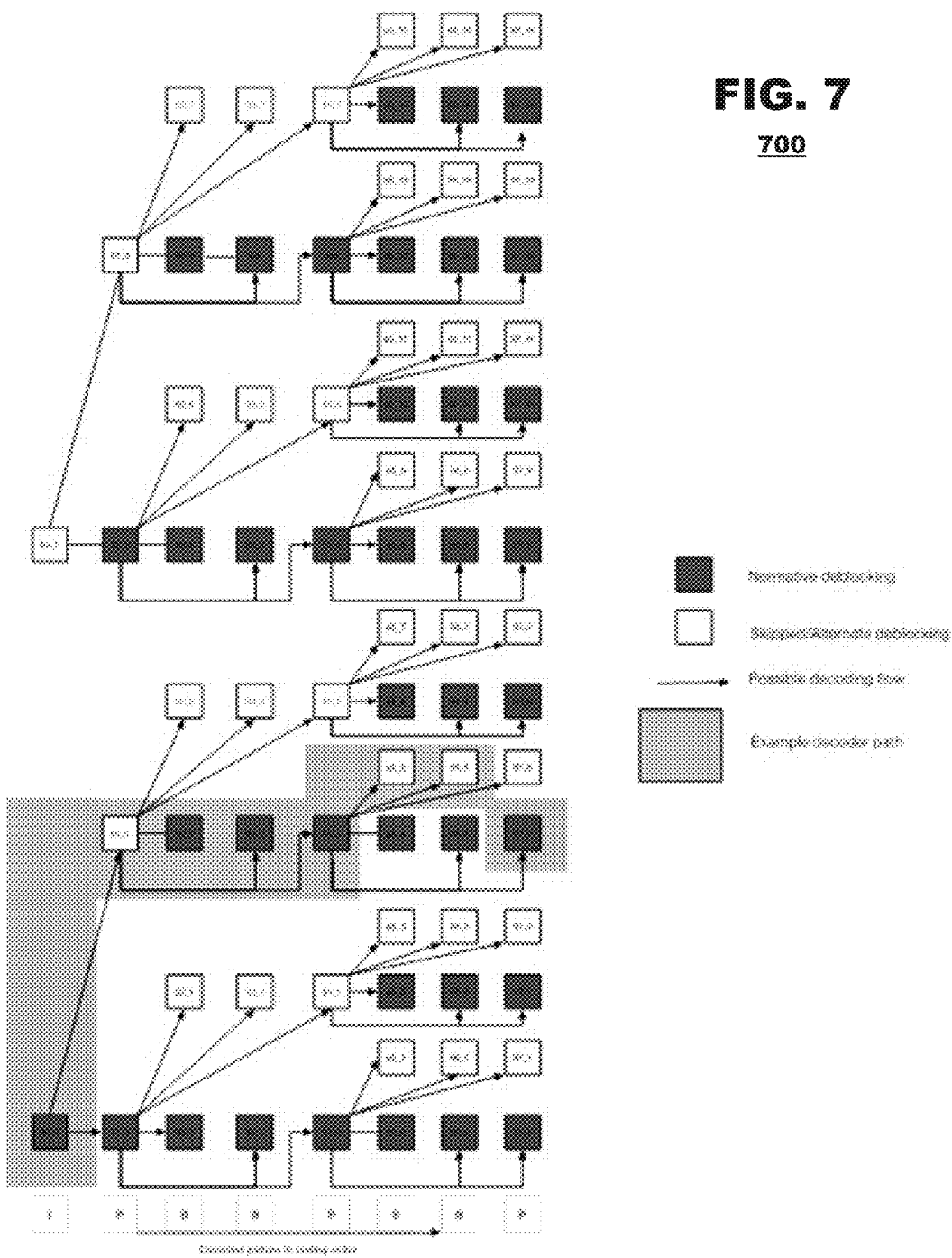
FIG. 7 illustrates a state diagram that presents the impact of different best effort decoding decisions in a frame to subsequent frames.

FIG. 7 illustrates a state diagram that presents the impact of different best effort decoding decisions in a frame to subsequent frames 700. In particular, a decoder may decide to perform or not perform a best effort decoding modification in a picture. That decision would impact all other pictures that refer to that picture in terms of prediction. In this diagram a state is identified by the naming Sn_m, where n indicates the picture index (in decoding order) and m the current state that the picture is in. A state indicates the complexity characteristics and quality of the picture, which may include drift, given the decoding decision process. For m equal to 0, all pictures have used the normative decoding process and no best effort decoding was performed. In this case, no degradation in quality due to error propagation exists. If, however, for a picture it was decided to perform a best effort decoding process, then the state of that picture is altered, as well as the possible states that could be used for any subsequent pictures. For example, if for picture 0, a decoder decided to use best effort decoding, its own state is then changed to S0_1, whereas for all other pictures only a state that connects directly or indirectly to S0_1 is allowed. For example, for picture 1, only states S1_2 and S1_3 are possible, for picture 2 only states S2_4 and above are allowed and so on. Metadata that can provide the full information about these states could be provided in the bit stream to assist the decoding decisions. For an encoder that is capable of a look-ahead, then metadata could exist at the beginning of a GOP or every K pictures (if look-ahead is shorter than the GOP) describing all possible states and paths to the decoder. Otherwise, the metadata could be signaled picture by picture. The decoder can make decisions in that case picture by picture or, if it is allowed a small delay, extract first the metadata from all pictures available and then make appropriate best effort decoding decisions.

For example, whereas the filtering operations of deblock filter 426 (FIG. 4) may operate as governed by the coding protocol to which the encoder 400 adheres (say, AVC), deblocking operations of one of the best effort decoders 440 may employ a deblocking filter that does not conform to that standard. For example, the deblocking filter (not shown) may operate according to another coding protocol (say, HEVC). A deblocking filter (not shown) of another best effort decoder 450 may be rendered disabled and perform no deblocking at all.

In an alternative embodiment, and in the case of real time communications, the decoder may be able to provide feedback to the encoder on when and how it altered the decoding process in the context of best effort decoding. In such a scenario, the encoder may be able to better utilize and signal drift compensation mechanisms, e.g., signal more intra macroblocks/CUs, and thus improve overall quality. An encoder may or may not be aware of the exact best effort decoding decisions that the decoder did but may know roughly what was done. In the case that it knows the exact steps, an encoder may backtrack through the decoding process, regenerate all reference pictures in its reference decoder buffer in a bit exact manner given the actual decoder's mode of operation. This allows the encoder to replicate exactly the current state of the decoder. Using this methodology it can then accurately stop any further degradation due to mismatches between the encoder and decoder. On the other hand, if only a rough estimate of the decoder's behavior exists, that may still be sufficient in reducing drift somewhat.

In a separate embodiment, the concept of best effort decoding could also be combined with bit stream switching, i.e., in the context of adaptive streaming. Different bit streams, in particular, may be associated with a different complexity estimate, as well as quality and/or bitrate. A decoder may decide to perform best effort decoding if the complexity/distortion tradeoff justifies this decision, or it could instead select a different bit stream that may provide a better complexity/distortion tradeoff than best effort decoding could achieve.

Figure 8:
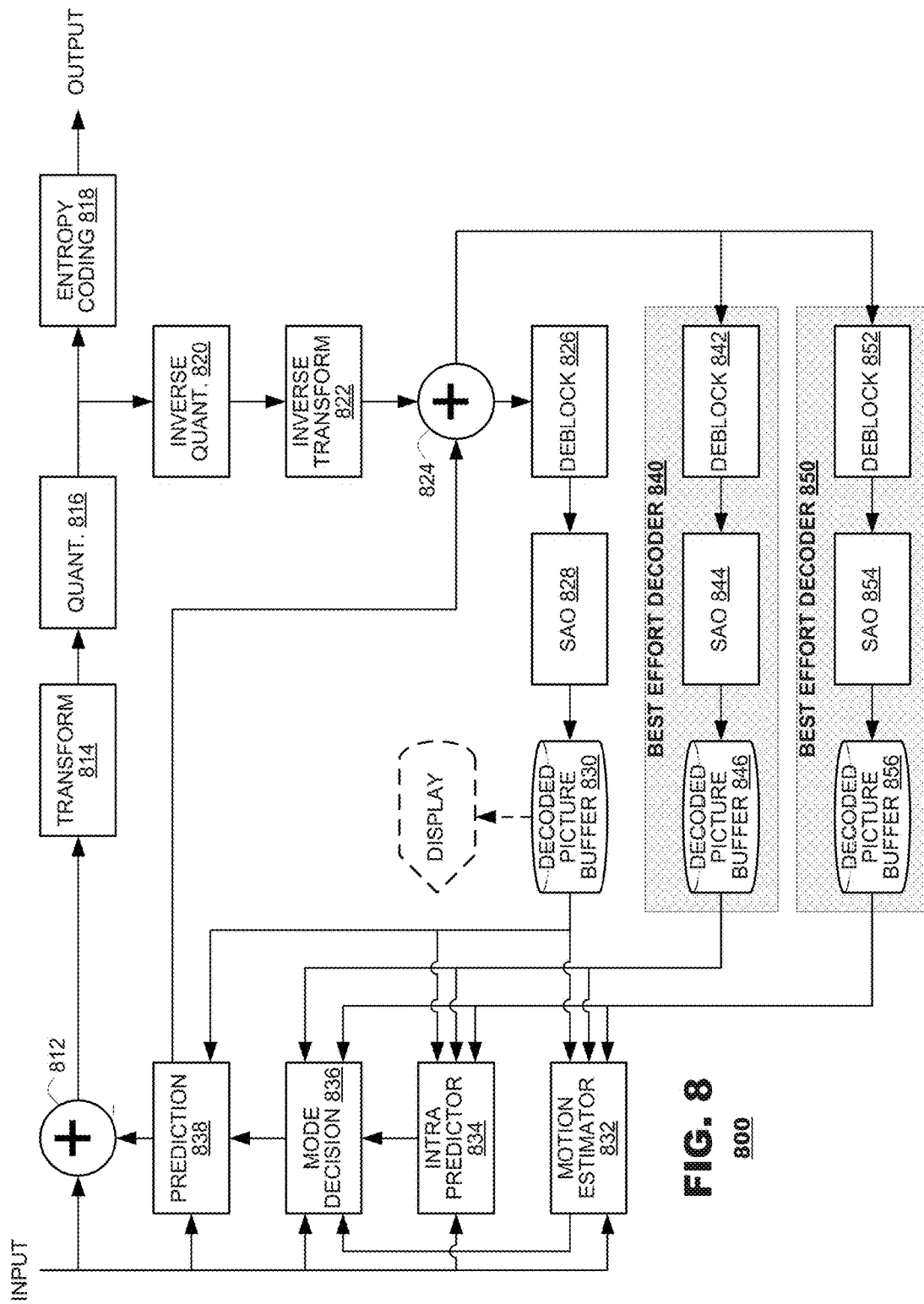
FIG. 8 illustrates an encoder according to another embodiment of the present disclosure.

FIG. 8 is a functional block diagram of an encoder 800 according to another embodiment of the present disclosure. The encoder 800 may include a subtractor 812, a transform unit 814, a quantizer 816 and an entropy coder 818. The subtractor 812 may generate pixel residuals from a comparison of input video data and video data generated by a prediction unit 838. The transform unit 814 may perform a transform (such as a discrete cosine transform or a wavelet transform) of pixel residuals. The quantizer 816 may downscale transform coefficients by quantizer parameters (not shown). The entropy coder 818 may perform entropy coding of the quantized transform coefficients. The entropy-coded coefficients may be output from the encoder 800 as part of coded video data, along with indicators of their respective quantizer parameters.

The encoder 800 also may include, as part of its decode circuitry, an inverse quantizer 820, an inverse transform unit 822, and an adder 824. The inverse quantizer 820 may invert quantization operations performed by the quantizer 816. The inverse transform unit 822 may invert transform operations performed by the transform unit 814. Thus, transform coefficients may be converted back to pixel residuals. The adder 824 may add prediction video data to prediction residuals obtained by the inverse transform unit 822.

The operations of the quantizer 816 and the inverse quantizer 820 typically are lossy processes. Therefore, transform coefficients output from the inverse quantizer 820 likely will exhibit losses with respect to the transform coefficients as they were input to the quantizer 816. These losses may propagate throughout other components of the encoder 800.

The encoder 800 also may include a deblocking filter 826, a sample adaptive offset filter 828, a decoded picture buffer 830, a motion estimator 832, an intra predictor 834, a mode decision unit 836, and a prediction unit 838. The deblocking filter 826 may perform deblocking operations on image data output from the adder 824. The sample adaptive offset filter 828 may perform filtering on data output from the deblocking filter 826. The decoded picture buffer 830 may store decoded pictures output from the SAO filter 828. The decoded picture buffer 830 may store all decoded pictures, if desired, for example, to estimate coding quality or, alternatively, it may store only the reference pictures that may be used for later prediction operations. In this latter case, the decoded picture buffer 830 may operate as a reference picture cache 226 (FIG. 2). The motion estimator 832 may perform a motion estimation search between an input image and stored reference pictures for purposes of inter prediction coding. The intra predictor 834 may perform intra prediction searches between an input image and previously coded content of the same image for intra prediction coding. The mode decision unit 836 may select a coding mode (e.g., inter prediction, intra prediction, no coding (skip)) for a new element of input video. The prediction unit 838 may supply prediction data for use in coding the new element of input video according to the selected mode.

During operation, the coded video data may include indicators identifying selected parameters for the deblocking and SAO filters 826, 828, and/or other in-loop filter mechanisms that may exist within the codec, as well as the prediction mode selected for coding and parameters (ex.: motion vectors) for the selected prediction mode.

The foregoing discussion illustrates coding elements that are common to many coding protocols. Different coding protocols may represent these elements with terminology that is different from the terminology listed herein. Some coding protocols may omit one or more of these elements. The foregoing description, however, is merely explanatory and provides context for discussion of best effort decoders, as described below.

As illustrated in FIG. 8, an encoder 800 may include one or more "best effort" decoders 840, 850 that may perform decoding processes that are different than those mandated by a governing protocol. In the illustrated embodiment, a best effort decoder 840 may include a best effort ("BE") deblocking filter 842, a BE SAO filter 844 and a decoded picture buffer 846. The BE deblocking filter 842 may perform deblocking according to a technique different than the technique at work in the encoder's 800 coding protocol. The BE SAO filter 844 may perform SAO filtering according to a technique different than the technique at work in the encoder's 800 coding protocol. The decoded picture buffer 846 may store decoded pictures generated by the best effort decoder. The encoder 800 can have as many best effort decoders 840, 850, each with their own BE deblocking filter 852, BE SAO filter 854, and decoded picture buffer 856, as may be desired for a given application.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method, comprising, at an encoder:
    coding a first point of a video sequence according to a first coding protocol generating a coded video sequence therefrom,
    decoding the coded video sequence according to the first coding protocol,
    decoding the coded video sequence according to an alternate coding protocol, wherein the alternate coding protocol, if used at a receiving decoder, will cause a loss of decoder state synchronization between the encoder and the receiving decoder, comparing decoding performance of the first coding protocol to decoding performance of the alternate coding protocol, transmitting, in a channel to the receiving decoder, coded video data representing the video sequence coded according to the first coding protocol, and an indicator of relative performance of the alternate coding protocol, responsive to an indication from the receiving decoder that decoder state synchronization has been lost because the receiving decoder selected, based on the transmitted indicator of relative performance, to decode the video sequence according to the alternate coding protocol, estimating a state of the decoder based on the decoding of the coded video sequence according to the alternate coding protocol, and thereafter, coding a new portion of the video sequence according to the first coding protocol using the estimated state.

2. The method of claim 1, wherein the comparison of decoding performances includes estimating resource conservation to be achieved by decode of the coded video data according to the alternate coding protocol.

3. The method of claim 1, wherein the comparison of decoding performances includes estimating relative distortion between decode of the coded video data according to the alternate coding protocol and decode of the coded video data according to the first coding protocol.

4. The method of claim 1, further comprising:

decoding the video sequence according to a second alternate coding protocol, comparing decoding performance of the first coding protocol to decoding performance of the second alternate coding protocol, transmitting, in a channel, coded video data representing the video sequence coded according to the first coding protocol, and an indicator of relative performance of the second alternate coding protocol.

5. A decoding method, comprising:

responsive to channel data that contains video data coded according to a first protocol and a metadata hint including an indicator of relative performance of an alternate coding protocol that, if used at a receiving decoder, will cause a loss of decoder state synchronization between an encoder and a receiving decoder, determining from the indicator of relative performance, whether to decode coded video data according to the first coding protocol or the alternate coding protocol, decoding the coded video data according to one of the first coding protocol and the alternate coding protocol based on the determination, and transmitting, to the channel, an indication of whether decoder state synchronization has been lost due to the determination from the indicator of relative performance.

6. The method of claim 5, wherein the metadata hint comprises an indication of resource conservation to be achieved by decode of the coded video data according to the alternate coding protocol.

7. The method of claim 5, wherein the metadata hint comprises an indication of relative distortion between decode of the coded video data according to the alternate coding protocol and decode of the coded video data according to the first coding protocol.

8. The method of claim 5, further comprising transmitting a message to an encoder indicating when decoding is performed according to the alternate coding protocol.

9. The method of claim 5, further comprising, storing data representing a resource conservation policy, wherein the determination is made with reference to the resource conservation policy.

10. The method of claim 5, wherein decoded video data obtained according to the alternate coding protocol is stored in a picture buffer for use in later decoding of coded video data according to the first coding protocol.

11. The method of claim 5, wherein the alternate decoding protocol includes alternate deblocking operations inside the decoder prediction loop.

12. The method of claim 5, wherein the alternate decoding protocol includes alternate deblocking operations inside the decoder prediction loop.

13. A system comprising:

a video decoder to decode video according to a first coding protocol, a video decoder to decode video according to an alternate coding protocol that, if used at a receiving decoder, will cause a loss of decoder state synchronization between an encoder and a receiving decoder, a selector to receive coded video data coded according to the first coding protocol and, responsive to a metadata hint associated with the coded video data, wherein the metadata hint includes an indicator of relative performance of the alternate coding protocol, to route the coded video data to a selected one of the video decoders, and a transmitter to transmit, to a channel, an indication of whether decoder state synchronization has been lost due to the selection of one of the video decoders.

14. The system of claim 13, wherein the metadata hint comprises an indication of resource conservation to be achieved by decode of the coded video data according to the alternate coding protocol.

15. The system of claim 13, wherein the metadata hint comprises an indication of relative distortion between decode of the coded video data according to the alternate coding protocol and decode of the coded video data according to the first coding protocol.

16. The system of claim 13, further comprising a transmitter to transmit a message to an encoder indicating when decoding is performed according to the alternate coding protocol.

17. The system of claim 13, further comprising, a storage device for data representing a resource conservation policy, wherein the determination is made with reference to the resource conservation policy.

* * * * *